H. HICKMAN.
TRAIN STOPPING APPARATUS.
APPLICATION FILED OCT. 5, 1916.
1,332,837.
Patented Mar. 2, 1920.
2 SHEETS—SHEET 1.
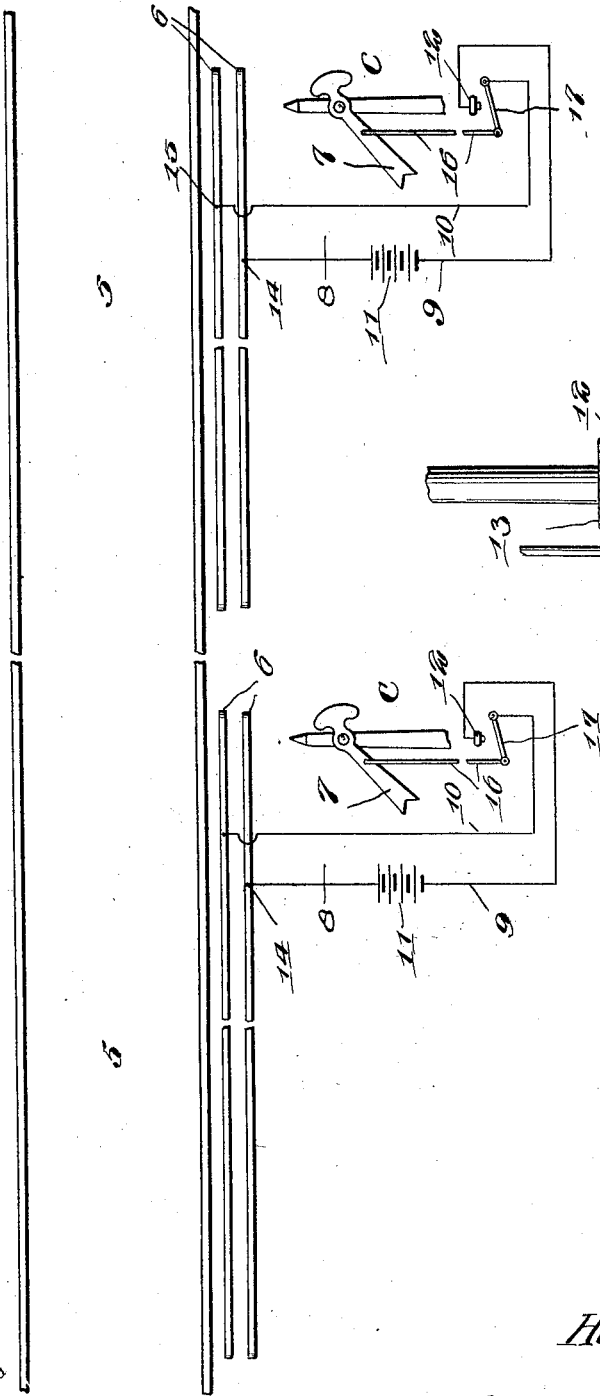
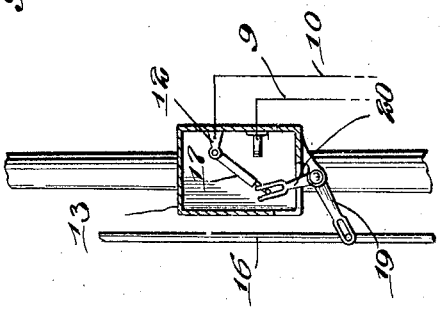
Inventor
Harry Hickman.
Witnesses
Frederick L. Joe,
By Victor J. Evans.
Attorney

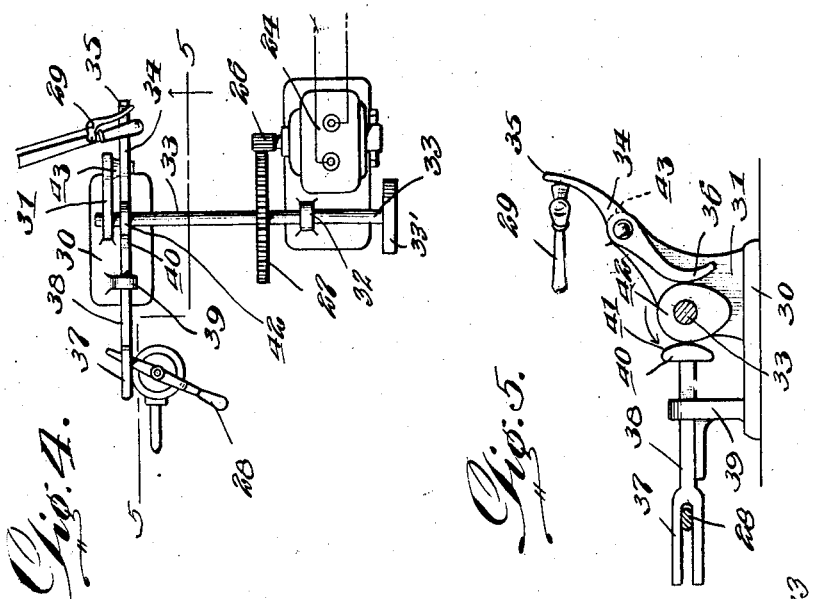

UNITED STATES PATENT OFFICE.

HARRY HICKMAN, OF PORT PENN, DELAWARE.

TRAIN-STOPPING APPARATUS.

1,332,837. Specification of Letters Patent. Patented Mar. 2, 1920.

Application filed October 5, 1916. Serial No. 123,930.

*To all whom it may concern:*

Be it known that I, HARRY HICKMAN, a citizen of the United States, residing at Port Penn, in the county of New Castle and State of Delaware, have invented new and useful Improvements in Train-Stopping Apparatus, of which the following is a specification.

The present invention contemplates the production of a train stopping apparatus for automatically stopping a train in case of the engineer attempting, by neglect or carelessness to run beyond the block in which the danger signal is set.

In carrying out the present invention it is my purpose to provide a train stopping apparatus which may be installed and maintained at a minimum cost and which will operate effectively and efficiently under all weather conditions.

In carrying out the invention use is made of a motor installed in the cab of the locomotive and operated by the contact of a pair of insulated shoes engaging with a pair of spaced parallel third rails, whereby an electric circuit is completed and which in turn operates suitable mechanism for operating the throttle valve lever and the brake valve lever to successively shut off the propelling power of the locomotive and apply the brakes to the wheels.

With the above and other objects in view the improvement resides in the construction, combination and arrangement of parts set forth in the following specification and falling within the scope of the appended claims.

In the drawings:

Figure 1 is a diagrammatic view of the track and semaphores,

Fig. 2 is a rear elevation of a locomotive with means for completing a circuit through the ramp rails, Fig. 3 is a diagrammatic view of the electric motor and audible signal circuits, Fig. 4 is a plan view of the cab mechanism by means of which the air brake valve is directly controlled and also the throttle valve, Fig. 5 is a view on the line 5—5 of Fig. 4, Fig. 6 is a fragmentary view in section of a modified form of a circuit closer.

Referring more particularly to the drawings, 5 designates the trackway upon which the locomotive B travels. Disposed along the trackway 5 and to one side thereof is a pair of spaced parallel third rails 6. When the semaphore arm 7 of the signal "C" moves to danger position a circuit will be completed through rails 6, upon the approach of a locomotive carrying contact devices engaging these rails. I employ a normally open circuit 8 consisting of conductors 9 and 10 and having connected therein a battery or generator 11. These conductors 9 and 10 are terminally connected at one end with the contacts 12 positioned in the switch box 13, while the opposite end of the conductor 9 is connected with one of the third rail tracks, as indicated at 14, while the opposite conductor 10 is terminally connected with the opposite third rail. This signal C as shown is in the form of a semaphore having connected with the movable arm 7 thereof an operating rod 16 tending to operate the switch blade 17, upon the setting of the blade to danger position, through the medium of the switch operating mechanism 19 and 20 respectively.

The character 21 denotes a circuit closer carried by the locomotive B and constituting a pair of spaced depending arms 22 carrying at their lower ends shoes 23 insulated from one another, whereby when the train approaches a block these shoes will impinge against the spaced parallel third rails, of course, assuming that the blade is now set in danger position, a circuit will be completed for the motor 24. Motor 24 constitutes a part of the cab mechanism, and the shaft of the motor carries a pinion 26 meshing with gear 27 for operating the cab mechanism. This mechanism last named is intended to shut off the propelling power of the locomotive and simultaneously apply the brakes. The handle of the brake valve is designated 28 and the throttle valve lever is shown at 29. A base 30 has formed therewith a supporting arm 31 and journaled in the supporting arm 31 and the bearing lug 32 of the base plate upon which the motor 24 is installed, is journaled a shaft 33 on which the gear 27 is mounted and preferably adjacent one end thereof. Fulcrumed upon the upper end of the supporting arm 31 is a substantially S-shaped lever 34 provided with an upper arm 35 and a lower arm 36 curved in a direction opposite to the curvature of arm 35. Lever 34 is pivoted on the element 31, and the upper arm 35 of the lever is arranged to come in contact with the throttle valve lever 29 at all times for the purpose of automatically shutting off the propelling power of the motor vehicle. In order, however, to apply the brakes to the locomotive upon the cutting off of the propelling power, I have illustrated the brake lever 28 as mounted in the forked end 37 of the plunger 38, the latter being mounted in the guide 39 formed on the support 30 in advance of the supporting arm 31 for longitudinal sliding movement. The displacement of this plunger 38 from the guide 39 is prevented owing to the fact that the opposite end of the plunger is provided with a head 40 having a convexed active face 41. The shaft 33 has positioned thereon adjacent the end journaled in the supporting arm 31, an operating member 42 which as illustrated is in the form of a cam and when the cam is in normal position the same is set to work against the convexed lower arm 36 of the lever 34 and the convexed active face 41 of the head 40, whereby when movement is imparted to the shaft 33 the cam is turned in a direction indicated by the arrow in Fig. 5, which in turn will rock the lever 34 and throw the concaved upper arm 35 thereof to actuate the throttle valve lever 29 cutting off the propelling power of the vehicle, whereas upon the completion of this operation the cam will reciprocate or slide the plunger 38 in its guide 39 and operate the brake valve lever to a closed position applying the brakes to the vehicle and automatically stopping the latter. In order to allow for a free rocking movement of the lever 34 I provide the upper end of the supporting arm 31 with an integral and laterally extending member 43 affording a bearing for the pivot of the lever.

An audible signal 44 is installed in the cab and is operated through the medium of the conductors 45 terminally connected to the contact points of the motor 24 and connected at their opposite terminals to the circuit closer 21.

I do not desire to limit myself to the operation of this apparatus by aid of the semaphore and switch blade. As for the latter, wires may be run to any point such as signal tower or station and the circuit closed by merely pushing a button or closing a switch. The arrangement of the third rails shown with respect to the track rails are purely for the purpose of having a clear understanding of the invention, as these third rails may be located at any point with respect to the track rails, regardless of the position of the semaphore.

Having thus described the invention, what I claim is:

1. In apparatus of the class described, a plurality of ramp rails, means carried by a train for engaging the ramp rails, a motor carried by the train and energized through said means and ramp rails, an apparatus controlled by the motor for controlling a plurality of valves, said apparatus including a shaft operatively connected with the motor, an eccentric member carried by the shaft, a slidable member for engaging and operating the handle of one of the valves, a pivoted member for engaging and operating the handle of other of said valves, the operative portion of the cam being normally in neutral position between the pivoted member and slidable arm, and engaging them successively upon the rotation of the shaft in a predetermined direction.

2. In apparatus of the class described, a plurality of valves, a handle for operating one of said valves, a lever for operating the other of the valves, a slidable member engaging the handle, a shoe carried on one end of the slidable member, a lever and means for pivotally mounting the latter, said lever comprising a plurality of arms curved in opposite directions, one of the arms engaging the aforesaid lever, a cam engaged by the other arm of the lever, said cam engaging and operating the slidable member including the shoe thereof, after making a partial revolution, a shaft for rotating the cam, a motor for driving the shaft, and means for operatively connecting the motor with a ramp rail, a signal operated simultaneously with the energization of said ramp rail.

In testimony whereof I affix my signature.

HARRY HICKMAN.